United States Patent [19]
Martindale

[11] 3,941,050
[45] Mar. 2, 1976

[54] COLD BRANDING APPARATUS FOR VULCANIZED TIRES

[75] Inventor: Troy E. Martindale, Memphis, Tenn.

[73] Assignee: The B. F. Goodrich Company, Akron, Ohio

[22] Filed: July 10, 1974

[21] Appl. No.: 487,056

[52] U.S. Cl. .................. 101/11; 101/27; 101/31; 101/44
[51] Int. Cl.² ........................................ B41F 17/00
[58] Field of Search ............ 101/11, 31, 27, 43, 44

[56] References Cited
UNITED STATES PATENTS

| | | | |
|---|---|---|---|
| 1,981,808 | 11/1934 | Maranville | 101/31 X |
| 3,418,926 | 12/1968 | Hakogi | 101/44 X |

*Primary Examiner*—Clifford D. Crowder
*Attorney, Agent, or Firm*—Joseph Januszkiewicz; W. A. Shira, Jr.

[57] ABSTRACT

An apparatus for cold branding of vulcanized tires wherein an endless conveyor is suspended from a support frame having a plurality of stations located along the closed path of the conveyor. A plurality of branding machines are mounted on the conveyor for movement therewith along the endless path of the conveyor. The conveyor means and branding machines are moved intermittently along the closed path stopping at the stations for a predetermined time interval to provide unloading and loading of tires therefrom with the cold branding being done during the movement of the tires between the stations. Heating is provided to the branding machines for heating the branding heads for branding the sidewalls of a tire carried by the branding machines.

15 Claims, 11 Drawing Figures

COLD BRANDING APPARATUS FOR VULCANIZED TIRES

BACKGROUND OF THE INVENTION

This invention relates to the branding of tires and more particularly to a cold-branding apparatus wherein a name or mark is branded onto the sidewalls of a cured tire.

In the manufacture of tires, it is customary during the vulcanization process to provide on the mold, a recess to receive a branding plate which has raised indicia thereon, so that during the vulcanization process, the company name or mark is imprinted thereon. In certain instances it is desirable to delete the brand name from the mold and cure the tire in otherwise the conventional way. Thereafter such unbranded tires are stored and thereafter branded as needed. The manufacture and storage of such unbranded tires facilitates the continuous uninterrupted manufacturing process. Such after branding is referred to as cold-branding.

Cold-branding involves the use of a branding plate which has either raised indicia thereon or recesses engraved indicia therein to facilitate the flow of rubber therein to form the indicia. The plate containing the indicia is heated to a temperature below that which will burn rubber, and by pressing such heated plate or platen against the sidewall of a tire will imprint a mark on the tire and giving the appearance as if such mark was part of the initial vulcanization process. The branding times vary in accordance with the temperature and pressure applied. In order to facilitate the cold or after branding process, a cold-branding machine has been developed which receives a tire, has a pair of plates, one being heated to permit the cold-branding process to be applied to the desired area of a tire. In order to achieve greater efficiency, an apparatus has been developed which reduces the handling time for processing these tires and effecting greater overall efficiencies.

SUMMARY OF THE INVENTION

The present invention contemplates an apparatus for the cold-branding of tires that are fully vulcanized with a mark or indicia while moving from a first station to a second station. Such stations are loading areas as well as discharge areas wherein an endless conveyor means has a plurality of branding apparatus moveable therewith. Each branding apparatus has facilities for supporting a tire with means for supporting the sidewall in cooperation with a moveable heated platen which vulcanizes the mark or indicia onto the sidewall of a tire. Each branding apparatus passes specified stations in seratim order, wherein each station facilitates the unloading and loading of a tire. The conveyor moves in a step by step action wherein the branding process is accomplished while the conveying means carries a tire as supported by the branding apparatus while in motion. Such apparatus increases the efficiency of the cold-branding process while improving the quality of the mark.

DETAILED DESCRIPTION

Figure 1:
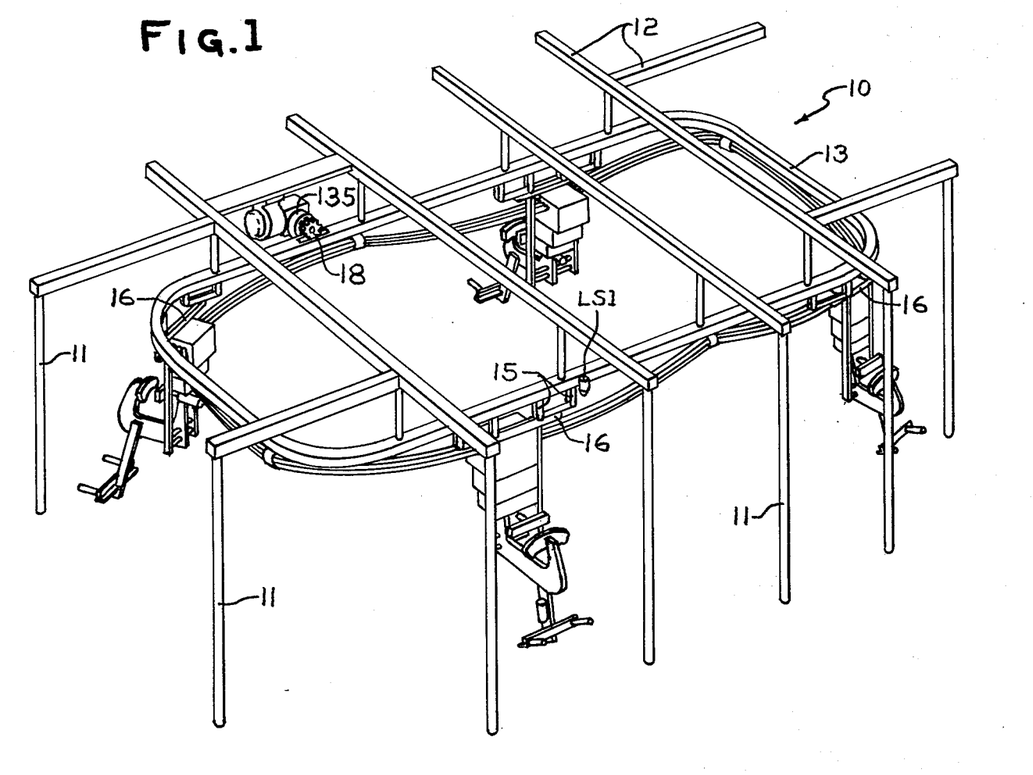
FIG. 1 is a perspective view of the invention without the fluid and electrical supply means.
Figure 3:
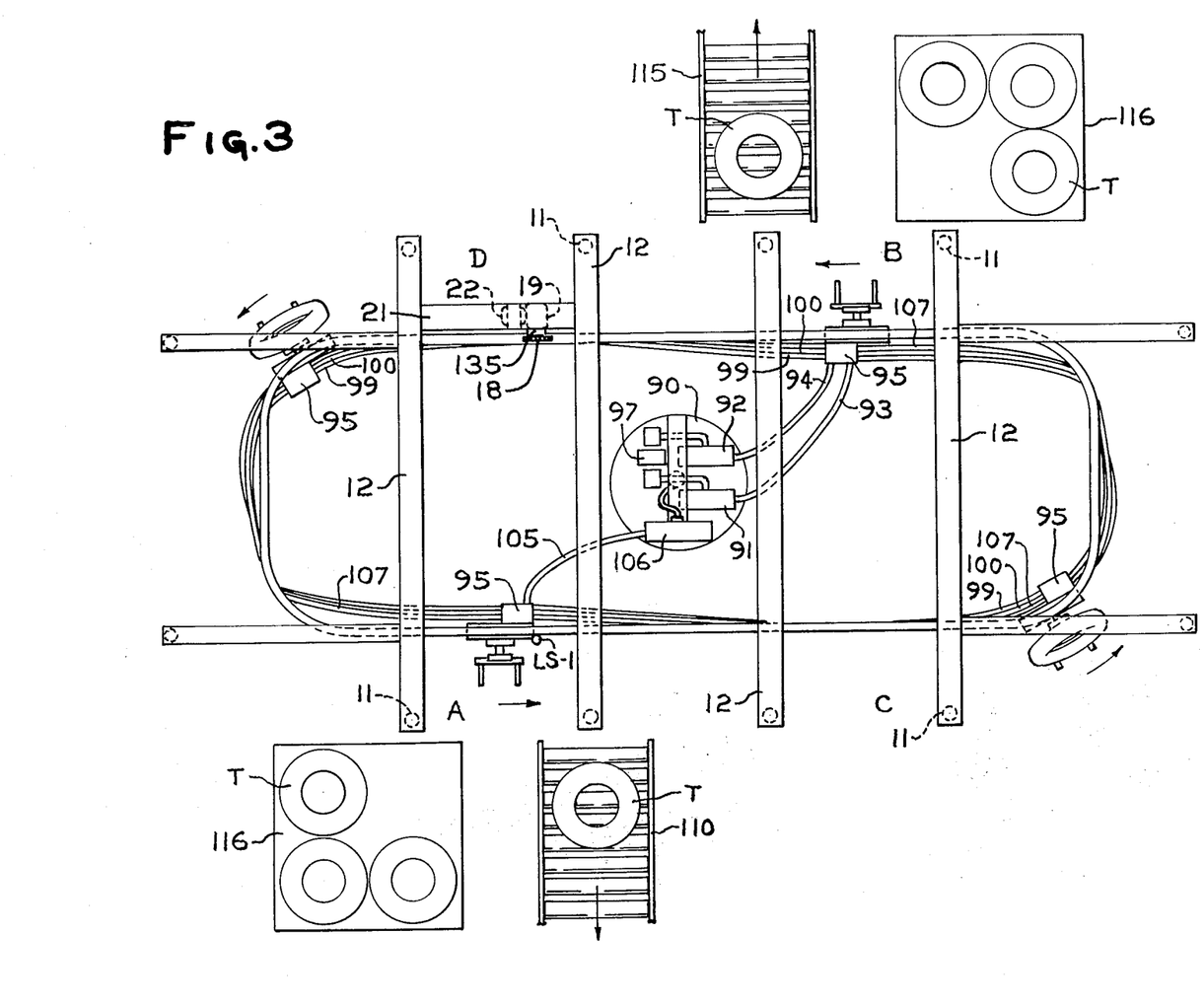
FIG. 3 is a plan view of the invention shown in FIG. 1 with the electrical and fluid supply means.

Referring to the drawings wherein like reference characters designate like or corresponding elements throughout the several views, there is shown in FIGS. 1 and 3 an endless conveyor means 10 supported by a support frame means. Such support frame means has a plurality of vertically extending posts 11 and horizontally disposed braces 12 which support an elliptically shaped track 13. Track 13 is U-shaped in cross section, as disclosed in FIG. 4, and journals for movement therein a sprocket chain 14 which has connected thereto pairs of depending brackets 15 which in turn has connected thereto a carrier mounting plate 16 which supports the branding apparatus or branding machine 20 to be described. The track 13 discloses four branding apparatuses 20; however, the number may be increased in accordance with the time cycle chosen and the length of the endless conveyor 10. Mounted between a pair of braces 12 is a brace 21 supporting a motor 22 whose output is connected to a transmission means 19 which has an output gear 18 which drives the sprocket chain 14. Such motor 22 and transmission 19 operate as a drive means for the conveyor means through a clutch means. Such clutch means is cooperative with a brake means which dynamically brakes the conveyor means in a manner old and well known in the art. Such clutch means and brake means are designated as clutch brake means 135 (FIG. 3).

Branding apparatus 20, supported by plate 16, has a pair of spaced brackets 23 and 24 depending therefrom. Located between brackets 23 and 24 at the lowermost end portion thereof is a U-shaped bracket 25 that is secured thereto by cylindrical pins 26 and 27. One end portion of the bracket 25 has a stationary platen 30 that is adjustably secured thereto as by bolt means 31. The other end portion of bracket 25 pivotally supports an adjustable support member 32 as at 33. Suitably secured closely adjacent to such other end portion of bracket 25 is a hydraulic cylinder or actuating means 35 having its piston rod 36 pivotally connected to a boss 37. Boss 37 is secured to the intermediate portion of support member 32. Pressurization of the rod end of cylinder 35 pivots support member 32 in a countercockwise direction about pivot means 33, whereas pressurization of the head end of cylinder 35 pivots support member 32 in a clockwise direction about pivot means 33 to adjust the position of the support member 32. The pressurization of the head end or the rod end is accompanied by the connecting of the rod end or head end of cylinder 35 to exhaust in a manner well known in the art.

Figures 4, 5, 9:
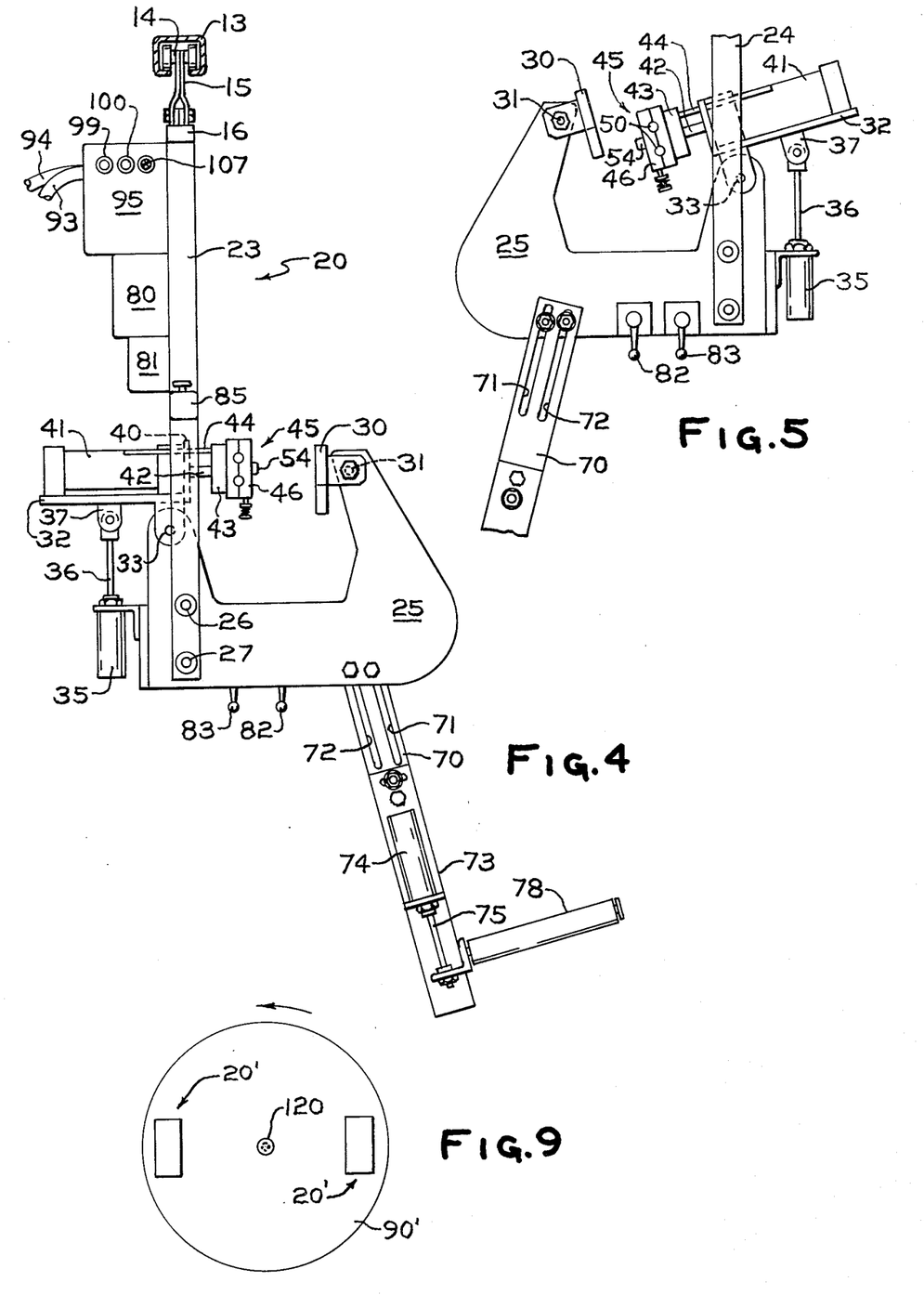
FIG. 4 is a side elevational view of the branding apparatus.
FIG. 5 is a fragmentary side elevational view of a portion of the branding apparatus showing the control levers and the apparatus shown in FIG. 4.
FIG. 9 is a diagrammatic plan view of a modified form of the invention showing an indexable table and two branding apparatus.
Figure 7:
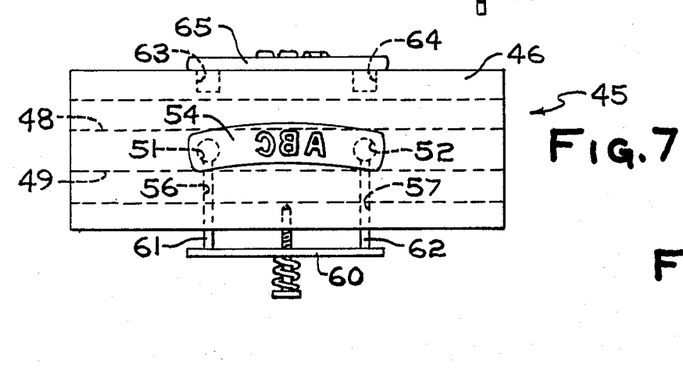
FIG. 7 is a front elevational view of the branding head.
Figure 8:
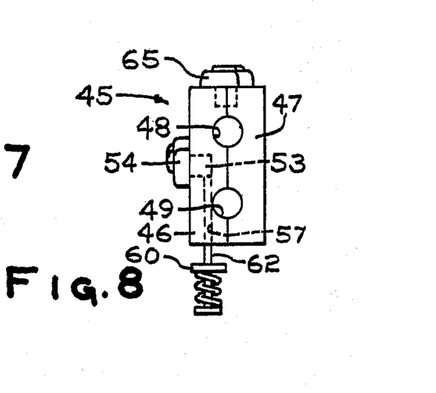
FIG. 8 is a side elevational view of the branding head.

The conduits to the head end and rod end of cylinder 35 are not shown in the drawings to facilitate a clearer view of the operating elements of the invention. Mounted on the one end of support member 32 is a vertically extending bracket 40 to which is secured one end of a hydraulic cylinder 41. Cylinder 41 is also secured to the rear portion of support member 32. Bracket 40 has a bore centrally located therein through which the piston rod 42 of cylinder 41 extends for connection to a bracket 43. Bracket 43 has a pair of guide rods 44 secured thereto and extending rearwardly therefrom through suitable bores in a bracket 40 to guide the bracket 43 in its linear reciprocal movement upon actuation of a hydraulic cylinder 41 for a purpose to be described. Bracket 43 has a piston 45 secured thereto, which platen is composed of a pair of plates, front plate 46 and rear plate 47. Platen 45 has a pair of spaced bores 48 and 49 (FIG. 8) extending longitudinally therethrough in vertical alignment such that upon separation of the plates 46 and 47, the respective cylindrical portions thereof facilitate the removal of heating elements 50 which are received by such bores 48 and 49, as depicted by FIG. 5. The splitting of the platen provides an easy access to the heating elements 50. This feature is important, as the heating and cooling of the heating elements 50 in the platen 45 often causes a welding of the heating element to the platen and a corresponding difficulty in the removal therefrom. The split feature of the bore also provides for a superior means for clamping the cylindrical heating elements which provides a positive surface contact throughout to insure a better heat distribution throughout. The front portion of front plate 46 has a pair of horizontally disposed bores 51 and 52 (FIG. 7) for receiving the rearwardly extending pins 53 of a branding head 54 which has either engraved indicia thereon or raised indicia. Plate 46 has a pair of spaced bores 56 and 57 extending from the lower planar surface and intersecting bores 51 and 52 respectively. A spring loaded plate 60 is suitably journaled on the lower portion of plate 46, having a pair of spaced rods 61 and 62 guided in bores 56 and 57 respectively and adapted to frictionally engage pins 53 of branding head 54. The upper portion of front plate 46 has a pair of spaced bores 63 and 64 adapted to receive the pins 53 of a second branding head 65 that is positioned thereon for bringing such branding head 65 to a desired temperature in preparation for a change in the marking of a subsequent operation. Platen 45 and branding head 54 may be made of aluminum.

Figure 2:
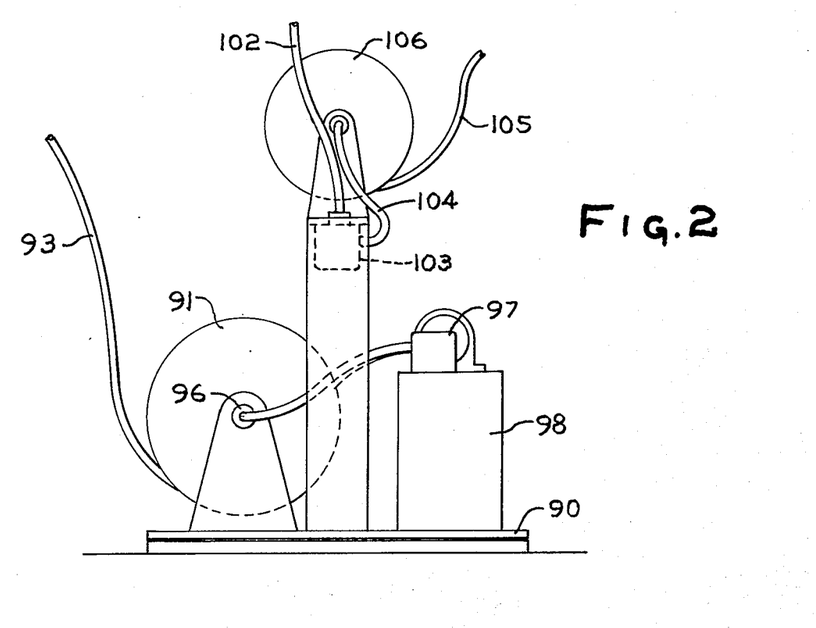
FIG. 2 is a side elevational view of the fluid power actuating means and the electrical power means.
Figure 6:
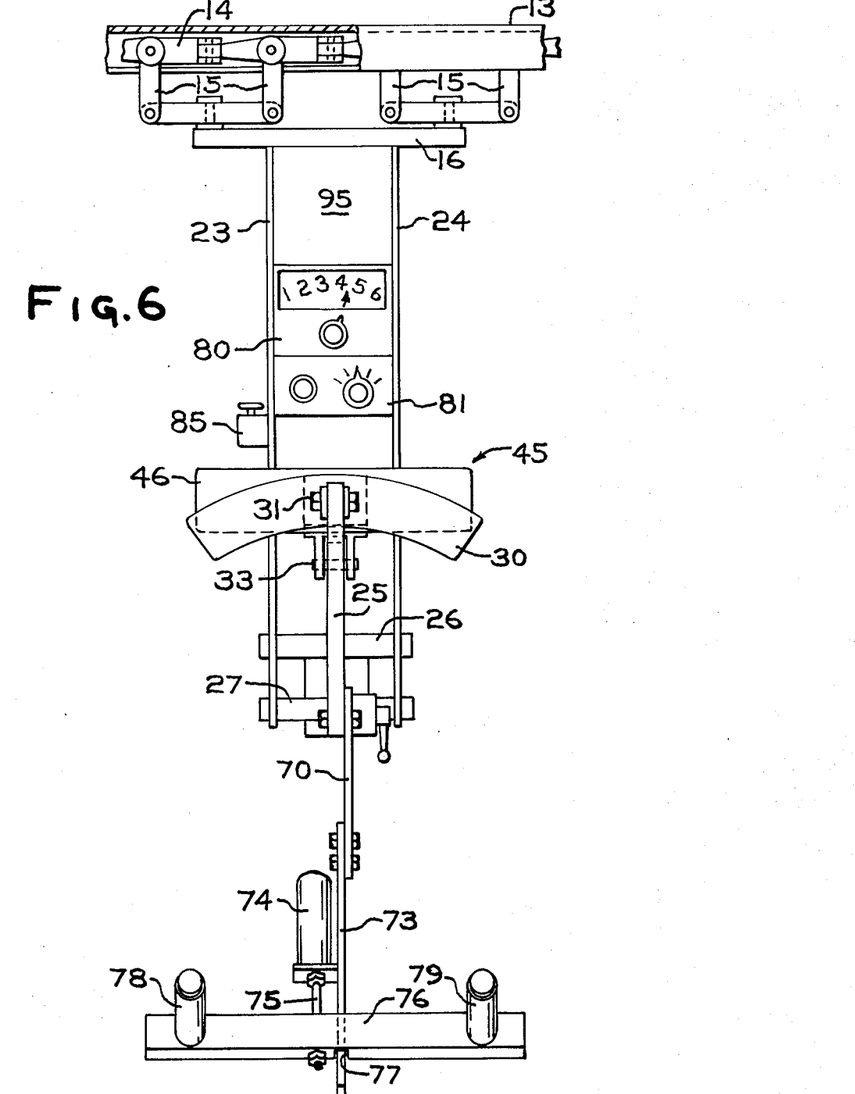
FIG. 6 is a front elevational view of the branding apparatus shown in FIG. 4.

An elongated bracket 70 is suitably secured to the U-shaped bracket 25 and extends downwardly therefrom. Bracket 70 is slotted as at 71 and 72 (FIG. 5) to provide a means for adjusting the position of bracket 70 in relation to the U-shaped bracket 25. A second bracket 73 (FIG. 6) is suitably secured to the lower portion of bracket 70. A hydraulic cylinder or actuating means 74 is suitably secured to the lower portion of bracket 73, having its piston rods 75 secured to a laterally extending moveable bracket 76, whose bracket 76 is slotted as at 77. Slot 77 rides on the edge of bracket 73, guiding the linear movement of bracket 76 as cylinder 74 is actuated to adjust the position of bracket 76 relative to the bracket 73. Bracket 76 has a pair of rollers 78 and 79 journaled on the outer ends thereof to support the lower portion of a tire in cooperation with the platen 30 which supports the upper portion of the tire. Located on the intermediate portion of brackets 23 and 24 is a housing 80 which contains the control means for regulating the temperature of the heating elements 50. Such control means includes a rheostat, and means for visually indicating the temperature of the heating elements 50. As shown in FIG. 5, control means 82 and 83 are shown as mounted on the intermediate lower portion of bracket 25, which control the actuation of hydraulic cylinders 74 and 35 respectively to adjust the position of rollers 78, 79 and the angle of the platen 45. As shown in FIGS. 2 and 3, a swivel turntable 90 is suitably mounted on the foundation encompassed by the endless conveyor 10. A pair of reels 91 and 92 (FIG. 3) are journaled on the turntable 90 for feeding out and reeling in hydrauilc hoses 93 and 94. The respective one ends of hoses 93 and 94 are connected to a housing 95 which is mounted between depending brackets 23 and 24 of the branding machine, which housing 95 has a manifold therein for distributing the pressurized fluid to the respective cylinders 74, 35 and 41. The supply lines and exhaust lines to and from the cylinders 74, 35 and 41 with the respective housing 95 are not shown to simplify the drawings shown in FIGS. 1 and 3. The other end of hoses 93 and 94 are secured to the respective spindles of the reels 91 and 92 and via suitable conduits and rotary unions 96 are connected to a pump means 97. A suitable reservoir 98 (FIG. 2) is provided on the turntable 90 for supplying fluid to the pump means 97. The manifolds of the housing 95 of each branding machine 20 are interconnected via flexible conduits 99 and 100 such that upon energization of motor 22, and an air clutch, sprocket 25 engages the sprocket chain 14 and moves the sprocket and branding machines 20 along with conduits 99 and 100 in its movement in the orbital path, with the turntable being rotated such that reels 91 and 92 rotate or pivot about the turntable axis as the conveyor 10 moves.

A suitable source of electrical power is supplied via a conduit 102 which, via connector means 103 which has the brushes and commutator rings therein, supplies power via cable 104 through reel 106 and cable 105 to housing 95 for use by the branding machine 20. A cable 107 (FIG. 3) distributes the power supply to the respective branding apparatuses 20. Such electrical power is used to heat the electrical element 50 and the respective platens 45 to a controlled temperature as preset by an operator at any of the stations to be enumerated herein. Each branding apparatus 20 has control means on housing 80 to preset the temperatures to the desired levels in a manner old and well-known in the art.

A pair of discharge conveyors 110 and 115 are located on opposite sides of the endless conveyor 10. Pallets 116 with tires to be branded thereon are positioned adjacent to the discharge conveyors 110 and 115. An operator standing between pallet 116 and discharge conveyor 110, which position is designated as Station A, provides the operator for a convenient location for loading tires onto the branding machine and for discharging the tires T therefrom.

Figure 10:
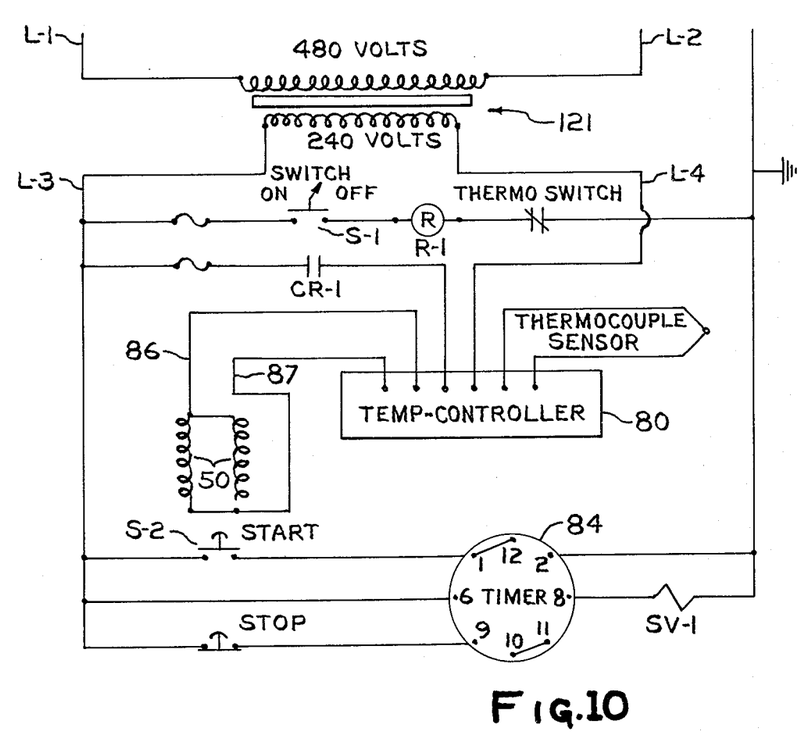
FIG. 10 is the schematic electrical circuit for the branding apparatus.

The circuit for the heaters 50 is disclosed in FIG. 10. A suitable source of current is supplied via conductors L-1 and L-2 to the primary winding of transformer 121. The secondary winding of transformer 121 is connected between the main conductors L-3 and L-4 to condition the circuit for operation. A number of branch conductors are connected across the main conductors for controlling certain of the functions of the heater. Depressing the main switch S-1 energizes relay R-1, which in turn closes contact CR-1 and conditions the circuit for the heaters via the temperature controller in housing 80. Such temperature controller, which can be manually preset to the desired temperature, will maintain the heating elements, or the CHROMALOX heaters 50, to the desired temperature level. A thermocouple 122 senses the temperature in the platen 45 and provides a feedback to the temperature controller 80. The temperature controller 80 has lines 86 and 87 connected to the heaters 50 to maintain a controlled flow of current to the heaters 50. When the desired temperature is achieved, switch S-2 is closed, which actuates hydraulic solenoid valve SV-1 which pressurizes the head end of hydraulic cylinder 41 to move the platen 45 into engagement with the sidewall of a tire for the branding operation. Simulaneously with such action, timer 84 is actuated such that after a preset time interval, the circuit will be interrupted to solenoid-operated valve SV-1 which in turn pressurizes the rod end of hydraulic cylinder 41 and in turn pressurizes the rod end of hydraulic cylinder 41 and moves the platen 45 away from the sidewall of a tire.

Figure 11:
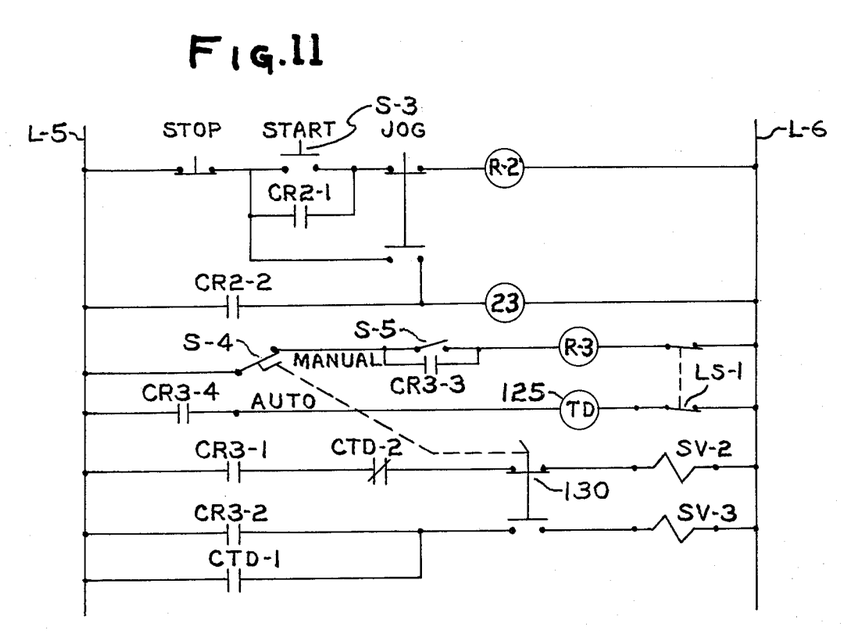
FIG. 11 is the schematic electrical circuit for the control of the conveyor.

The circuit for the conveyor is shown in FIG. 11 wherein a suitable source of current is supplied via conductors L-5 and L-6 to condition the circuit for operation. The depressing of switch S-3 energizes relay R-2 which closes contacts CR2-1 and CR2-2. Contact CR2-1 provides a holding circuit while contact CR2-2 energizes motor 22. The output of motor 22 to the chain 14 is conditioned upon actuation of clutch brake means 135; otherwise, motor 22 is disconnected from chain 14 and chain 14 is held stationary. In this context the brake is de-energized and the clutch energized to move the conveyor, and whenever the clutch is de-energized, the brake is energized to stop the movement of the conveyor. The operator can selectively choose between the manual or automatic operation. By setting switch S-4 to the manual operation, the footswitch S-5 controls the energization of relay R-3, which in turn controls the closing of contact CR3-1 which energizes solenoid-operated valve SV-2. Such energization actuates solenoid-operated valve SV-2 which in turn actuates clutch 135 to connect the output from motor 22 to sprocket 18 and moves conveyor 10. The conveyor will automatically stop when the limit switch LS-1 is contacted by one of the branding machines 20, which in turn deactuates the brake clutch means 135 to brake the conveyor, stopping the branding machines 20 at the respective operator's stations. This permits the operator to remove the branded tire from the machine and load an unbranded tire onto the machine.

In the setting of switch S-4 to the automatic cycling, switch 130 connected to switch S-4 conditions the operation of solenoid operated valve SV-3 in cooperation with a time delay relay 125. Time delay relay controls contacts CTD-1 and CTD-2. In the automatic cycling, the operation is initiated by foot switch S-5, which as in the manual operation closes contacts CR3-1, CR3-2, CR3-3 and CR3-4. This conditions the circuit for automatic cycling from station to station; however, as disclosed by this circuit, the operator must first depress switch S-5 to begin the operation. As shown, the conveyor movement is interrupted by limit switch LS-1 and the time delay relay 125 operates the opening and closing of contacts CTD-1 and CTD-2 for operating solenoid operated valve SV-3 which in turn controls clutch means 135. This provides sufficient time for loading and the unloading of a tire onto the branding machine 20.

In the operation of the apparatus described, assuming that the endless conveyor is stationary in the position shown in FIG. 3, the operator at Station A places a tire T from pallet 116 onto the branding machine 20 with the inner portion of the sidewall in engagement with the stationary platen 30. The operator then adjusts the supporting rollers 76 and 77 through the selective energization of the control cylinder 74 to assure the inner portion of the sidewall to be in engagement with the platen 30. The operator then energizes cylinder 35 to adjust the branding platen 45 to the desired angular position to position the branding head 54 into alignment with the portion of the tire to be branded. With the platen and branding head 45 suitably adjusted and heated, the operator then depresses switch S-2 to energize hydraulic cylinder 41 which moves the branding head 54 into engagement with the sidewall of the tire. The conveyor is then put in operating condition by depressing switch S-3 and S-4 which energizes motor 22 which moves the tire from position A to a second station designated Station B by the operation of limit switch LS-1. A second operator will remove the tire T from the branding apparatus 20 and place such tire T onto a discharge conveyor 115 and places a second tire T from pallet 116 onto the branding machine 20. Endless conveyor means 10 may be intermittently energized by a suitable timer circuit means as discussed above, whereby the movement of a tire between Stations A and B is automatic, which timer means is adjustable by the oeprator to provide the necessary time for vulcanizing a mark of the branding head onto the sidewall of a tire as the tire moves from Station A to Station B or from Station B to Station A. Such operation is a continuous intermittent operation which assures the continual flow of tires to and from the branding machines without the requirement that the operator move from the specific location. In lieu of pallets 116, suitable conveyor means may be provided similar to that of 110 and 115 to provide for a continuous supply of tires to Stations A and B. A modification of this system is shown in FIG. 9 wherein a turntable 90' is rotatably journaled on a shaft 120 with a pair of branding machines 20' located 180° apart. The branding machines 20' are similar to those discussed and described above and are only shown schematically wherein the turntable 90' is indexed 180° to provide for the continual supply and discharge of tires to and from the branding machines 20'. The operation is similar to that described above and, accordingly, the specific mechanism is not specifically described.

Various modifications are contemplated and may obviously be resorted to by those skilled in the art without departing from the described invention, as hereinafter defined by the appended claims, as only a preferred embodiment thereof has been disclosed.

I claim:

1. An apparatus for the branding of tires comprising support frame means; conveyor means mounted on said support frame means having a closed endless path; a plurality of stations located along said closed path of said conveyor means; a plurality of branding machines mounted on said conveyor means for movement therewith; drive means connected to said conveyor means for moving said conveyor means and said branding machines along said path; control means connected to said drive means for intermittently moving said branding machine along said path and to start and stop said branding machines at said stations; each of said branding machines having the tire support means; each branding machine having branding means operative to brand a tire sidewall; and heating means connected to said branding means for heating said branding means to preselected temperature for vulcanizing indicia onto tires held by said tire support means.

2. An apparatus as set forth in claim 1 wherein said conveyor means is suspended from said support frame means; and said closed endless path is an orbital path.

3. An apparatus as set forth in claim 2 wherein a turntable is mounted within said orbital path; power means mounted on said turntable for rotation therewith; conduit means extending from said power means to said branding machines; and said conduit means supported by conveyor means for movement therewith in an orbital path and rotating said turntable therewith.

4. An apparatus as set forth in claim 3 wherein said branding means includes a stationary platen and a moveable piston cooperative therewith; said stationary platen mounted on one end of said tire support means; and a branding head mounted on said moveable platen for cooperation with the sidewall of a tire and said stationary platen supporting a portion of such sidewall to vulcanize indicia thereon.

5. An apparatus as set forth in claim 4 wherein said stationary platen is adjustable; said moveable platen having first actuating means connected thereto for moving said branding head and said moveable platen toward and away from stationary platen; and second actuating means connected to said moveable platen for selectively adjusting the position of said moveable platen relative to said stationary platen.

6. An apparatus as set forth in claim 5 wherein said moveable platen is composed of a front and rear plate abutting each other on their coplanar surfaces; said moveable platen having a first pair of bores extending longitudinally therethrough with their central axes lying along said juncture; heating elements located in said first pair of bores for heating said moveable platen; said front plate having a second pair of aligned bores extending therein from the forwardmost surface portion thereof; said branding head having a pair of projections extending into said second pair of bores; locking means mounted on said front plate for retaining said branding head on said front plate; and retaining means on said front plate for securing a second branding head thereto for preheating said second branding head to a preselected temperature.

7. An apparatus for the branding of pneumatic tires comprising an endless conveyor means; a plurality of stations along the path of said conveyor means; a plurality of branding machines; said conveyor means supporting said branding machines in spaced relationship for movement intermittently from one station to another in a closed path; conveying means at each of said stations for supplying and taking away tires; each branding machine having means for supporting a tire thereon; a stationary platen on said tire support means for supporting an inner portion of a sidewall of a tire; a bracket mounted on said support means for supporting the lower portion of a tire; cylinder means connected to said bracket for adjusting the position of said bracket relative to said stationary platen; a moveable platen mounted on said branding machine for movement toward and away from said stationary platen; said moveable platen having a branding head thereon; first actuating means operatively connected to said moveable platen for selectively adjusting the angular position of said moveable platen relative to said stationary platen; second actuating means connected to said moveable platen for movement thereof toward said stationary platen to carry said branding head into engagement with the sidewall of a tire supported by said stationary platen, and held by said tire supporting means; and means for heating said moveable platen and branding head to vulcanize an indicia on the sidewall of a tire upon engagement of the sidewall of a tire by said heated branding head.

8. An apparatus as set forth in claim 7 wherein said moveable platen is composed of a front and rear plate abutting each other; said moveable platen having a bore extending longitudinally therethrough and having its central axis extending along the juncture of said plates; and a heating element mounted in said bore for heating said moveable platen and said branding head.

9. An apparatus as set forth in claim 8 wherein said branding head has a pair of projections; said front plate has a first pair of bores extending into a front face of said front plate to receive said projection from said branding head; a second pair of bores extending from the lower surface of said front plate to intersect said first pair of bores; said locking means mounted on said front plate having spring biased pin means moveable into said second pair of bores for projection into said first pair of bores to frictionally engage said projections of said branding head.

10. An apparatus as set forth in claim 9 wherein said moveable platen has a third pair of bores extending vertically therein from the top surface thereof to receive said projection of said branding head to preheat said branding head.

11. An apparatus as set forth in claim 10 wherein said moveable platen and said branding head is made of aluminum.

12. An apparatus as set forth in claim 11 wherein a turntable is mounted within said orbital path; a pair of reeling devices are mounted on said turntable; conduit means moveable from and onto said reeling devices; said conduitu means supported by said conveyor means and connected to said branding machine for supplying power to said actuating means and said heating elements.

13. An apparatus for the branding of tires comprising a platen having a front and rear plate member, said plate members having a planar surface for abutting each other; said platen having a pair of bores extending longitudinally therethrough with their central axis lying along the juncture of said planar surfaces; heating elements located in said first pair of bores; said front plate member having a pair of spaced bores extending horizontally therein; a third pair of bores extending from the lower portion of said front plate member intersecting said horizontally extending bores; a branding head having a pair of projections extending into said horizontally extending bores; locking means securing said branding head onto said front plate; said front plate having a pair of vertically extending bores extending from the upper surface portion downwardly therein, a second branding head received by said last mentioned bores for preheating thereof.

14. An apparatus as set forth in claim 13 wherein said locking means comprises a rod member secured to the lower surface portion of said platen; a bracket slideably received by said rod member; said bracket having a pair of vertically extending pins received by said vertically extending bores; spring means mounted on said rod member for biasing said projections upwardly into said bore.

15. An apparatus for the branding of tires comprising support frame means; a turntable mounted on said support frame for rotation between a pair of spaced stations; a plurality of branding machines mounted on said turntable for movement therewith; drive means connected to said turntable for indexing said turntable and said branding machines in a predetermined pattern of movement between stations in a predetermined time sequence; each of said branding machines having the tire support means; each branding machine having branding means operative to brand a tire sidewall; and heating means connected to said branding means for heating said branding means to a preselected temperature for vulcanizing indicia onto tires held by said tire support means.

* * * * *

UNITED STATES PATENT OFFICE
CERTIFICATE OF CORRECTION

Patent No. 3,941,050     Dated March 2, 1976

Inventor(s) Troy E. Martindale

It is certified that error appears in the above-identified patent and that said Letters Patent are hereby corrected as shown below:

Column 4, line 60, delete "for" and insert -- with --.

Column 7, line 23, delete "piston" and insert --platen--.

Column 8, line 28, delete "said" first occurrence and insert --and--.

Signed and Sealed this fifteenth Day of June 1976

[SEAL]

Attest:

RUTH C. MASON
Attesting Officer

C. MARSHALL DANN
Commissioner of Patents and Trademarks